No. 735,868. PATENTED AUG. 11, 1903.
G. A. W. & J. H. L. FOLKERS.
DEVICE FOR SHARPENING SAWS.
APPLICATION FILED OCT. 1, 1902.

NO MODEL.

Witnesses,
Inventors
George A. W. Folker
John H. L. Folker
By Dewey Strong & Co.
attys No. 735,868. Patented August 11, 1903.

UNITED STATES PATENT OFFICE.

GEORGE A. W. FOLKERS AND JOHN H. L. FOLKERS, OF SAN FRANCISCO, CALIFORNIA.

DEVICE FOR SHARPENING SAWS.

SPECIFICATION forming part of Letters Patent No. 735,868, dated August 11, 1903.

Application filed October 1, 1902. Serial No. 125,588. (No model.)

*To all whom it may concern:*

Be it known that we, GEORGE A. W. FOLKERS and JOHN H. L. FOLKERS, citizens of the United States, residing in the city and county of San Francisco, State of California, have invented an Improvement in Devices for Sharpening Saws; and we hereby declare the following to be a full, clear, and exact description of the same.

Our invention relates to improvements in saw filing and sharpening machines of the type employing rotary cutters or grinders. Its objects are in the direction of simplicity of construction and of securing steadiness and uniformity in operation of the file members in relation to the saw.

It comprises the parts and the combination of parts hereinafter set forth, having reference to the accompanying drawings, in which—

Figure 1:
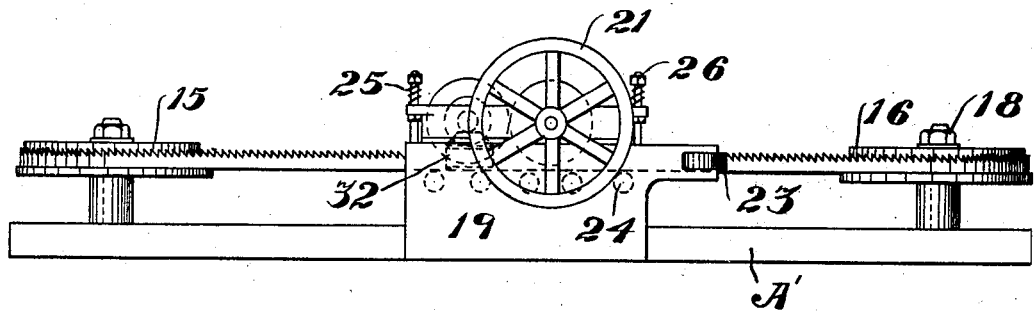
Figure 2:
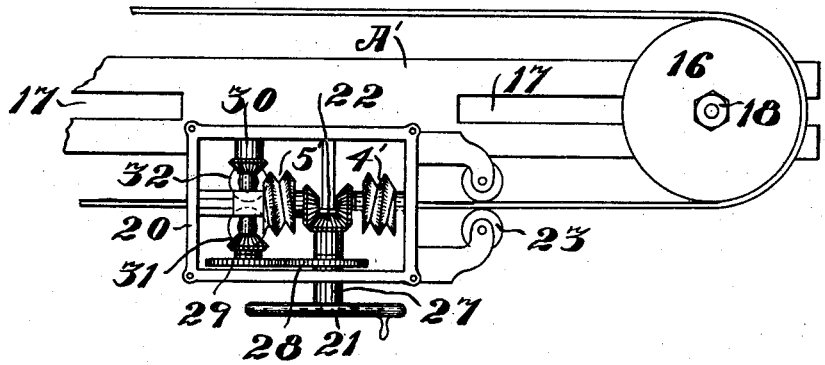
Figure 3:
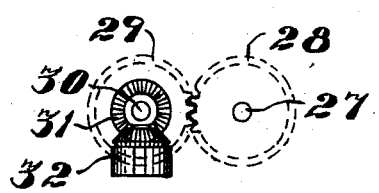
Figure 4:
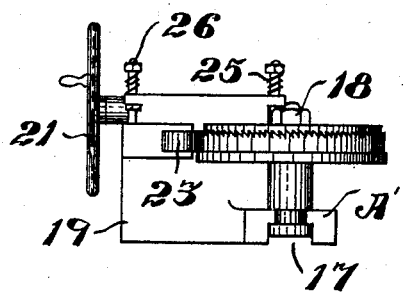

Figure 1 is a side elevation of our sharpening devices applied to a band-saw. Fig. 2 is a top view thereof, partially broken away. Fig. 3 is a detail showing the bevel-gears 28 29 and the bevel-gears between the latter and the friction-rollers 32. Fig. 4 is an end view of Fig. 1.

In Fig. 1 we show a form of file-sharpener adapted to band-saws, in which the saw is movable in relation to the file members. The frame A' supports two flanged rollers 15 16, mounted on vertical shafts, which are adjustable to and from each other in slots 17 in the frame by means of screws 18. The band-saw is slipped over these rollers and the tension of the saw regulated by operating the screws 18. Upon one side of the frame in suitable relation to the plane of the saw is a rigid structure 19, upon which is mounted the rectangular file-support 20, carrying the helical file members 4' 5'. These members are oppositely and simultaneously rotated by means of the crank-wheel 21 and the bevel-gearing 22, disposed intermediately of the adjacent ends of the shafts of the file members. The saw is supported in its passage beneath the grinders by the vertical rollers 23, which prevent lateral derangement, and by the horizontal rollers 24, upon which the lower edge of the saw rests. The pressure of the file members in the saw-teeth is regulated by the tension of springs 25, embracing the standards 26, on which latter the file-carriage is slidable vertically.

The crank-shaft 27 carries a gear 28, engaging a gear 29, mounted on a shaft 30, journaled in the sides of frame 20 above the saw. This latter shaft carries two bevel-gears 31, which engage similar gears on the vertical friction-rollers 32, disposed on each side of the saw. These vertical rollers are adapted to bear constantly against the sides of the saw and serve as feed-rollers to positively advance the saw. They have a relative movement with the grinders, so that as the latter make a certain number of revolutions sufficient to sharpen a tooth the saw will have an assured movement of, say, the equivalent of a tooth-space. Thus the grinders will be relieved of unnecessary strain in feeding the saw and the teeth will be filed uniformly.

Having thus described our invention, what we claim, and desire to secure by Letters Patent, is—

1. In a saw-sharpening device, the combination of a saw-support, helical file members, and means for positively advancing the saw relatively with the movement of said members.

2. In a saw-sharpening device, the combination of means for supporting a saw, helical file members disposed in relation to the teeth of said saw, means engaging the sides of the saw to advance the latter and means for rotating the file members.

3. In a saw-sharpening device, the combination of means for supporting a saw-blade, helical file members disposed in relation to the teeth of said saw, friction-rollers engaging the sides of the saw, and means by which said rollers and helical file members are rotated in unison.

4. In a saw-sharpening device, the combination of helical file members, a saw-support adapted to hold a saw in suitable relation to said members, and feed means independent of the frictional engagement of the members with the saw-teeth, by which one of said parts may be moved relative to the other.

In witness whereof we have hereunto set our hands.

GEORGE A. W. FOLKERS.
JOHN H. L. FOLKERS.

Witnesses:
S. H. NOURSE,
JESSIE C. BRODIE.